Figure 2:
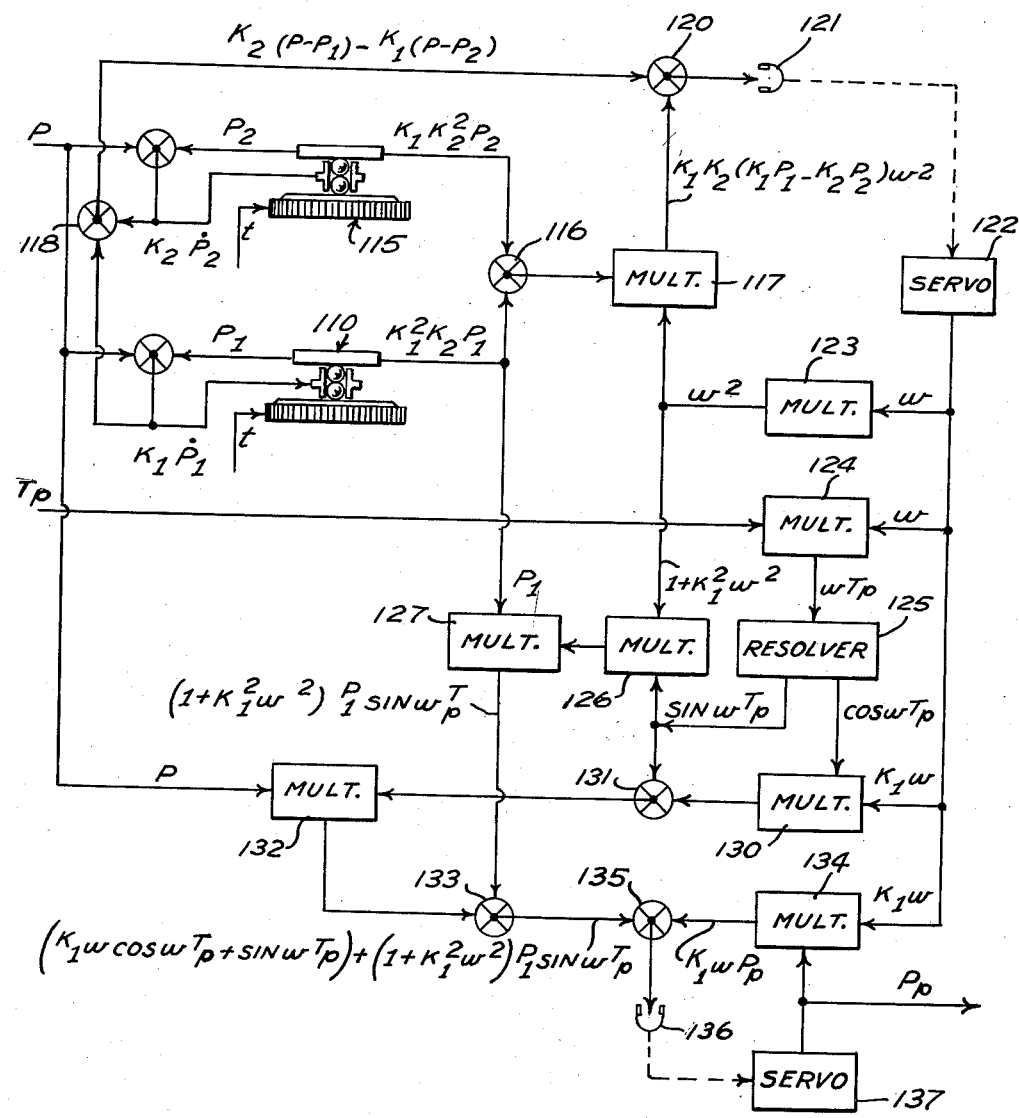

INVENTORS
WILLIAM H. NEWELL
EDWARD G. BURGESS
NORMAN J. ZABB
STAMATES I. FRANGOULIS

BY *Victor N. Borst*
ATTORNEY

United States Patent Office 2,978,177
Patented Apr. 4, 1961

2,978,177

DEVICE FOR PREDICTING VALUES OF A FLUCTUATING SYSTEM AT A PREDETERMINED FUTURE TIME

William H. Newell, Mount Vernon, Edward G. Burgess, Jr., Kew Gardens, Norman J. Zabb, Brooklyn, and Stamates I. Frangoulis, Flushing, N.Y., assignors to Sperry Rand Corporation, a corporation of Delaware Original application May 29, 1953, Ser. No. 358,324. Divided and this application Dec. 17, 1954, Ser. No. 476,038

5 Claims. (Cl. 235—186)

The present application is a division of application Serial No. 358,324, filed May 29, 1953.

The present invention relates to a method and apparatus for computing the characteristics of a fluctuating system continuously for successive future periods, and although it has a wide range of utility, it is particularly useful in predicting the future pitch angle (deck tilt) and the future heave (level) at a future time of a floating platform, such as the flight deck of a carrier.

In guiding an airplane in its approach towards a floating platform, such as the deck of a carrier, for landing, it is necessary to predict the time of landing and the pitch angle and heave of the deck at the predicted time, to assure safe landing. Since the carrier is continuously oscillating in pitch and has a continuous oscillating vertical movement, during the approach of the airplane, it becomes necessary to compute continuously the characteristics of the fluctuating motions of the carrier and to predict therefrom the pitch and heave of the carrier at the future predicted time of landing. Since the movement of the deck plane does not follow a uniform mathematical pattern or equation, it is seen that the matter of determining with accuracy the pitch and heave at a future time is not a simple problem.

One object of the present invention is to provide a novel device by which the characteristics of a fluctuating system may be computed and predicted continuously for successive future periods, even though the form of the system may be continuously varying and the variations in the system may not be following continuously any predetermined mathematical pattern or equation.

Another object is to provide a novel device by which the future pitch angle of a floating platform, such as the flight deck of a carrier, at the expected future instant of landing can be computed and predicted.

A further object is to provide a novel device by which the future heave or flight deck level of a floating platform, such as that of a carrier, at the expected future instant of landing can be computed and predicted.

In carrying out the invention, the value of a certain quantity at a future time in a fluctuating system is computed continuously, by computing at each instant from the present value of said quantity and from the future time, the predicted future value of the quantity at said future time, based on the assumption that the characteristics of the system at any instant continues from that instant to said future time in accordance with a definite mathematical pattern, and as the subsequent values of said quantity deviate from any assumed characteristic of the fluctuating system and follow a new characteristic of a different mathematical pattern, recomputing the predicted value of the quantity at the future time based on the assumption of the new characteristic of the fluctuating system.

In its more specific aspects, the invention is employed for continuously predicting the pitch angle and heave of the floating platform at a future time by computing at each instant from the present pitch angle and heave and from the future time the predicted pitch angle and heave based on the assumption that the fluctuations in pitch angle and heave follow sine waves respectively of definite configurations from that instant to the future time, and as the subsequent values of pitch angle and heave deviate from respective sine waves of assumed configurations and follow the sine waves of different configurations, recomputing the predicted pitch angle and heave on the basis of sine waves of said different configurations.

Figure 1:
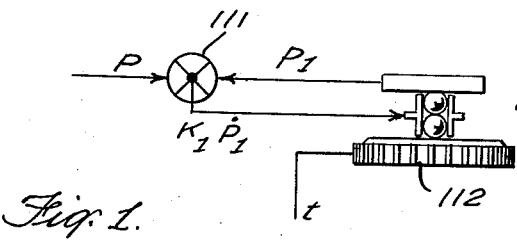

Various other objects, features and advantages of the present invention are apparent from the following particular description and from an inspection of the accompanying drawings, in which Fig. 1 is a diagrammatic view of an integrator type follow-up employed in connection with a form of mechanism for determining the predicted pitch angle of the deck at any future time in accordance with a simplified equation; and Fig. 2 is a diagrammatic view of a form of mechanism employing integrator type follow-ups of Fig. 1 for determining the predicted pitch angle of the deck at any future time in accordance with a simplified equation, the solid lines indicating mechanical motion and the dotted lines electrical signals.

To predict the position of a ship's deck at the future instant of landing of an approaching plane, it is required that the time ahead when the airplane is expected to land be predicted and then that the position of the deck at this time be predicted. This sequence of predictions is based on the assumption that the pilot has sole control of the plane speed and that the position of the deck at touchdown (the position on the deck where the plane can begin to land) is not preselected.

The time required by a plane to fly from its present position to its position at touchdown on the deck indicated herein by the symbol $T_p$ can be calculated in the manner described in the aforesaid copending application. For computing the predicted pitch angle of the deck at the predicted time $T_p$ of landing indicated by the symbol $P_p$ and the predicted deck height at the predicted time $T_p$ indicated by the symbol $H_p$, it is necessary to determine continuously the present pitch angle of the deck indicated by the symbol $P_0$ and the present deck height indicated by the symbol $H_0$.

To supply continuously information on the magnitude of the present ship pitch angle, service of a stable element is required. This stable element could be of any well known construction. For example, it could be one of the stable elements commonly employed in connection with firing control systems on warships, except that it would be provided with means for transmitting the pitch $P_0$ to the system, for example in the form of a shaft rotation. There is also the possibility that the stabilizer unit required in connection with the radar antenna drive could also be used to supply the information $P_0$. There is also in existence a pitch and roll recorder. This unit might also be used, if the accuracy and smoothness of operation were satisfactory for the purpose in mind.

Continuous measurement and supply of the $H_0$ that is the vertical motion of the ship may be effected by an accelerometer of the type shown and described in the aforesaid copending application.

Having determined a value for the prediction time $T_p$, the second phase of the prediction problem is entered into, namely the deck tilt $P_p$ at the future time $T_p$. Consider first a ship at rest in still water. If now a moment should be applied about an athwartship axis through the center of gravity, some pitch angle, say P would result. Upon removal of this applied moment, the ship would oscillate in pitch about the athwartship axis with decreasing amplitude, the equation of motion being approximately $$I\ddot{P}+C\dot{P}+KP=0 \tag{18}$$

where $I$ is the effective longitudinal moment of inertia of the ship about the athwartship pitch axis, $C$ is the damping moment coefficient due to skin friction and the like, $K$ is the hydraulic restoring moment coefficient, $\ddot{P}$ is the second derivative of the pitch angle, with respect to time and $\dot{P}$ is the first derivative of the pitch angle with respect to time. Now the period of this oscillation is the pitching period of the ship and is equal to $$T=\frac{2\pi}{w_{np}}=\frac{2\pi}{\sqrt{\frac{K}{I}-\frac{C^2}{4I^2}}}$$

where $w_{np}$=natural angular frequency of pitch. However, when the ship is in a seaway, the equation of motion 18 becomes $$I\ddot{P}+C\dot{P}+KP=F(t)$$

where $F(t)$ represents the pitch component of the moment applied to the ship by wave action. Now from general observation, it can be said that $F(t)$, although highly variable, will nevertheless at a given hour exhibit a frequency spectrum in which certain narrow bands of frequencies are predominant. From an analyzed recording of pitch angle of various type ships headed into the wind under different sea conditions over extended periods of time, it would be possible to obtain the frequency spectrum of the ship's pitching motion under the conditions existing at the time of the run. From this data, it would be noted that the frequencies of greatest amplitude would correspond to the natural pitch period of the ship, the periods at which the ship is encountering the particular wave systems running at the time, the period of ship roll and the period of heave. The last two periods mentioned would probably be of small import and are included only because of the fact that both rolling and heaving cause an induced pitch. Usually, but not always, there will be a single system of waves running. Furthermore, this system of waves will more often than not be running in nearly the same direction as the wind. Hence, the normal expectation during carrier landing operations is that the ship would be headed in a direction about opposite to that in which the waves are traveling. Considering that the usual period of ocean waves is in the range of 5 to 10 seconds, a ship speed of 25 knots would reduce these periods to the range of 1.8 to 5.5 seconds. It almost seems from these considerations that under such conditions, the only period to be seriously considered in pitch motion would be the natural pitch period. That is, a forcing moment function of 2 second period would have to be of tremendous magnitude to appreciably affect the ship motion in pitch. However, a forcing function of 5 second period might well have an appreciable effect, and of course a longer period forcing function would have still greater influence. Functions having such longer periods would arise if the normal conditions outlined above did not hold—as for example, when the wind is opposite in direction to the sea and the ship is traveling with a following sea.

From the above discussion, it is evident that an exact solution for the equation of motion of the ship is not possible. However, the equation of motion may be represented with sufficient accuracy by the approximation $$I\ddot{P}+KP=F(t)=a\sin(wt+\phi)$$

where $F(t)$ is a sine function of unknown amplitude $a$, angular frequency $w$ and phase angle $\phi$. The solution of this differential equation is then of the form $$P=a_1\sin(w_1t+\phi_1)+a_2\sin(w_2t+\phi_2) \tag{20}$$

$w_1$ and $w_2$ being the unknown angular velocities and $\phi_1$ and $\phi_2$ the phase angles of the simple harmonic motions of which the pitch angle is assumed to be composed. This form, involving the six unknown parameters $a_1$, $a_2$, $w_1$, $w_2$, $\phi_1$ and $\phi_2$, therefore represents the time variations of pitch angle. Hence, if these six unknowns and variable parameters can be continuously determined and furthermore if a continuous value of prediction time $T_p$ is available, then the predicted pitch angle is $$P_p=a_1\sin[w_1(t+T_p)+\phi_1]+a_2\sin[w_2(t+T_p)+\phi_2] \tag{21}$$

The problem is now therefore reduced to the continuous determination of the six unknown and variable parameters noted above.

In the form of mechanism which can be employed in accordance with the present invention to determine the predicted pitch angle $P_p$, it is assumed in Equation 20 that $a_1=a$ and $a_2=0$, so that $$P=a\sin(wt+\phi) \tag{22}$$

Considered here as known quantities are the present value of pitch angle $P$ as well as the rates of change $\dot{P}$, $\ddot{P}$, etc. Furthermore, if means are provided for recording $P$, the values of $P$ and its rates at any past instant of time will be known. From this known data, the quantities $a$, $w$ and $\phi$ which are for the present considered to be constants, must be determined. Now this evaluation is carried out in accordance with the present invention in the manner described herein.

Suppose for instance that Equation 22 is rewritten in the form $$P=-\frac{ia}{2}e^{i(wt+\phi)}+\frac{ia}{2}e^{-i(wt+\phi)} \tag{23}$$

where $a$, $w$ and $\phi$ are unknown constants, and let $P$ be connected to an integrator type follow-up 110 as shown in Figure 1. This follow-up comprises a substracting differential 111 and an integrator 112 with a time constant $K_1$ and an output $P_1$ consituting one of the inputs of the differential, the other input being the quantity $P$. Then in operational notation, $$P-P_1=K_1\dot{P}_1 \text{ or}$$

$$P_1=\frac{P}{K_1p+1} \text{ where } p=\frac{d}{dt}$$

$$P_1=\frac{1}{K_1}\left[C_1e^{\frac{-t}{K_1}}+e^{\frac{-t}{K_1}}\int e^{\frac{t}{K_1}}\cdot a\sin(wt+\phi)dt\right]$$

$$=\frac{C_1}{K_1}e^{\frac{-t}{K_1}}-\frac{ia(1-iK_1w)e^{i(wt+\phi)}}{2(1+K_1^2w^2)}+\frac{ia(1+iK_1w)e^{-i(wt+\phi)}}{2(1+K_1^2w^2)}$$

Here, since the sine wave is assumed to have $a$, $w$ and $\phi$ constant, the transient term $$\frac{C_1e^{\frac{-t}{K_1}}}{K_1}$$

may be dropped for steady state conditions with the result that $$P_1=\frac{-ia(1-iK_1w)}{2(1+K_1^2w^2)}e^{i(wt+\phi)}+\frac{ia(1+iK_1w)}{2(1+K_1^2w^2)}e^{-i(wt+\phi)} \tag{24}$$

Similarly, if $P$ is connected to a second integration type follow-up similar to that shown in Figure 1, there is obtained the quantity $$P_2=\frac{-ia(1-iK_2w)}{2(1+K_2^2w^2)}e^{i(wt+\phi)}+\frac{ia(1+iK_2w)}{2(1+K_2^2w^2)}e^{-i(wt+\phi)} \tag{25}$$

It is now possible to eliminate the two quantities $$+\frac{iae^{i(wt+\phi)}}{2} \text{ and } -\frac{ia}{2}e^{-i(wt+\phi)}$$

from the three Equations 23, 24 and 25. The result of this elimination written in determinant form is $$\begin{vmatrix} P & 1 & 1 \\ P_1 & \dfrac{1-iK_1w}{1+K_1^2w^2} & \dfrac{1+iK_1w}{1+K_1^2w^2} \\ P_2 & \dfrac{1-iK_2w}{1+K_2^2w^2} & \dfrac{1+iK_2w}{1+K_2^2w^2} \end{vmatrix} = 0$$

The expansion of this determinant gives the value $w^2$ $$w^2 = \frac{K_2(P-P_1) - K_1(P-P_2)}{K_1K_2(K_1P_1 - K_2P_2)} \quad (26)$$

Having determined $w$ from Equation 26 as the positive square root of the expression on the right hand side and knowing the prediction time $T_p$, the predicted pitch angle $P_p$ can be determined $$P_p = -\frac{ia}{2}e^{iwT_p} \cdot e^{i(wt+\phi)} + \frac{ia}{2}e^{-iwT_p} \cdot e^{-i(wt+\phi)} \quad (27)$$

As before, the quantities $$+\frac{ia}{2}e^{i(wt+\phi)} \text{ and } -\frac{ia}{2}e^{-i(wt+\phi)}$$

may be eliminated from the three Equations 23, 24 and 27. The result of this operation gives the determinant relation $$\begin{vmatrix} P_p & e^{iwT_p} & e^{-iwT_p} \\ P & 1 & 1 \\ P_1 & \dfrac{1-iK_1w}{1+K_1^2w^2} & \dfrac{1+iK_1w}{1+K_1^2w^2} \end{vmatrix} = 0$$

which when expanded may be written in the form $$K_1wP_p - (K_1w \cos wT_p + \sin wT_p)P + (1+K_1^2w^2)P_1 \sin wT_p = 0 \quad (28)$$

The mechanization for solving Equations 26 and 28 for the value $P_p$ is shown diagrammatically in Figure 2, the solid lines indicating mechanical movement, the dotted lines indicating electrical signals. In this mechanism, the quantity P which is equivalent to $P_0$ previously discussed, i.e. the present pitch angle, derived from the stable element is introduced into the integrator type follow-up unit 110 is previously decribed and shown in Figure 1, to obtain the output $P_1$ which by proper gear ratio becomes $K_1^2K_2P_1$ and the same quantity P is introduced into a second integrator type follow-up unit 115 with proper gear ratio to obtain an output quantity $K_1K_2^2P_2$. The two output quantities $K_1^2K_2P_1$ and $K_1K_2^2P_2$ are subtracted in a differential gear 116 to give an output quantity $K_1K_2(K_1P_1 - K_2P_2)$ which is multiplied in a unit 117 by $w^2$ to give the quantity $K_1K_2(K_1P_1-K_2P_2)w^2$. This latter quantity and the quantity $K_2(P-P_1)-K_1(P-P_2)$ derived as the output of a differential 118 having input $K_1P_1$ equal to $P-P_1$ and input $K_2P_2$ equal to $P-P_2$, multiplied by proper gear ratios $K_2$ and $K_1$ respectively, are fed into a differential 120 to obtain the difference between $K_1K_2(K_1P_1-K_2P_2)w^2$ and $$K_2(P-P_1) - K_1(P-P_2).$$

This difference operates follow-up contacts 121 controlling a servo motor 122, and when this difference is zero, the contacts are opened and the servo motor shaft will have rotated an amount corresponding to the value of $w$ in accordance with Equation 26. This quantity $w$ is squared to the value $w^2$ by the unit 123 for introduction to the multiplier 117.

For solving Equation 28, the quantity $w$ and the quantity $T_p$ derived from the prediction time computer are multiplied together in a unit 124 and the resulting product $wT_p$ is introduced into a resolver 125 to obtain component quantities $\sin wT_p$ and $\cos wT_p$. The quantity $\sin wT_p$ is fed into a multiplier 126 in conjunction with the quantity $1+K_1^2w^2$, obtained by proper gear ratio and offset of the output $w^2$ obtained from the multiplier 123, to obtain the product $(1+K_1^2w^2) \sin wT_p$ which is multiplied in the unit 127 by the quantity $P_1$ obtained by proper gear ratio from the output of the integrator type follow-up unit 110 to obtain the quantity $$(1+K_1^2w^2)P_1 \sin wT_p.$$

The other component quantity $\cos wT_p$ from the resolver 125 is fed into a multiplier 130 and multiplied therein by the quantity $K_1w$ obtained by proper gear ratio from the output $w$ of the servo motor 122 to obtain a product which is fed into a differential 131 in conjunction with the component quantity $\sin wT_p$ to obtain the sum $K_1w \cos wT_p + \sin wT_p$. This latter quantity is multiplied by the quantity P in a unit 132 and the resulting product in conjunction with the product from the unit 127 is fed into a differential 133 to obtain the quantity $$(K_1w \cos wT_p + \sin wT_p)P + (1+K_1^2w^2)P_1 \sin wT_p.$$

This latter quantity and the quantity $K_1wP_p$ obtained from the output of a multiplier 134 into which the magnitudes $P_p$ and $K_1w$ are fed are introduced into a differential 135 to obtain the difference between $K_1wP_p$ and $$(K_1w \cos wT_p + \sin wT_p)P + (1+K_1^2w^2)P_1 \sin wT_p.$$

This difference operates follow-up contacts 136 controlling servo motor 137, and when this difference is zero, the contacts are opened and the servo motor shaft will have rotated through an angle corresponding to the value of $P_p$ in accordance with Equation 28.

Equations 26 and 28 may be mechanized by the mechanism of Figs. 1 and 2, to determine the value of $H_p$ (predicted deck height at predicted time $T_p$ of landing) exactly as was the value $P_p$ (predicted pitch angle of the carrier at the predicted time $T_p$). In that case, Equation 26 becomes $$w^2 = \frac{K_2(H-H_1) - K_1(H-H_2)}{K_1K_2(K_1H_1 - K_2H_2)}$$

and Equation 28 becomes $$K_1wH_p - (K_1w \cos wT_p + \sin wT_p)H + (1+K_1^2w^2)H_1 \sin wT_p = 0$$

H representing the present value of the deck height equivalent to $H_0$ and $H_1$ and $H_2$ being derived from integrator type follow-ups, similar to the follow-ups 110 and 115 of Fig. 2.

The mechanism of Figs. 1 and 2 may be set up as part of a system for guiding an airplane in its approach towards the flight deck of a carrier, as shown and described in the aforesaid copending application. However, as far as certain aspects of the invention are concerned, the method and mechanism of the present invention may be employed for continuously predicting the future value of a quantity in a fluctuating system. As will be noted, as the present values of the quantity are continuously fed into the mechanism, the future value of the quantity at a predetermined or predicted future time is computed on the assumption that the quantity undergoes a fluctuation of constant mathematical characteristic (sine wave in the more specific aspects of the invention) and as the quantity of present value continuously received deviates in value from this assumed characteristic, the value of the quantity at said future time is continuously recomputed until said future time arrives.

In the following claims, the symbols $T_p$, P and $P_p$ have the general meanings indicated with application generally to a fluctuating system, unless specifically defined.

What is claimed is:

1. A device for predicting the value of a fluctuating system at a future time $T_p$ knowing the present value of the system P, comprising means for mechanizing and solving the equations $$K_1K_2(K_1P_1-K_2P_2)w^2=K_2(P-P_1)-K_1(P-P_2)$$

and $$K_1wP_p-(K_1w \cos wT_p + \sin wT_p)P + (1+K_1^2w^2)P_1 \sin wT_p=0$$

for the predicted value $P_p$, and including two integrator follow-up devices, one for obtaining the quantities $K_1^2K_2P_1$ and $K_1\dot{P}_1$ and the other for obtaining the quantities $K_1K_2^2P_2$ and $K_2\dot{P}_2$, each of said follow-up devices comprising an integrator, a differential having a P input, a feed-back input from the output of said integrator and an output for setting the quantity to be integrated into said integrator, in said equations and in said quantities, $K_1$ and $K_2$, representing the time constants of said integrators respectively, $P_1$ and $P_2$ the outputs of said integrators respectively, $\dot{P}_1$ and $\dot{P}_2$ the first derivations of $P_1$ and $P_2$ respectively, and $w$ the angular velocity of the simple harmonic motion of which said system is assumed to be composed, means for comparing $K_1^2K_2P_1$ and $K_1K_2^2P_2$ to obtain $K_1K_2(K_1P_1-K_2P_2)$, means for multiplying the latter quantity by $w^2$ to obtain $K_1K_2(K_1P_1-K_2P_2)w^2$, means for comparing $K_1\dot{P}_1$ and $K_2\dot{P}_2$ to obtain $$K_2(P-P_1)-K_1(P-P_2)$$

means for comparing $K_1K_2(K_1P_1-K_2P_2)w^2$ and $$K_2(P-P_1)-K_1(P-P_2)$$

to obtain a quantity which is theoretically zero, but which deviates therefrom by an error amount, a servo mechanism having as an input the error quantity to effect a null seeking operation and to obtain thereby $w$, means for squaring $w$ to obtain $w^2$ by which $K_1K_2(K_1P_1-K_2P_2)$ is multiplied, means for multiplying $T_p$ by $w$ to obtain $wT_p$, a resolver having as input $wT_p$ for obtaining $\cos wT_p$ and $\sin wT_p$, means for multiplying $w$ by $K_1$ to obtain $K_1w$, means for multiplying the latter quantity by $\cos wT_p$ to obtain $K_1w \cos wT_p$, means for adding the latter quantity and $\sin wT_p$ to obtain $K_1 \cos wT_p + \sin wT_p$, means for multiplying the latter quantity by P to obtain $(K_1w \cos wT_p + \sin wT_p)P$, means for processing $w^2$ to obtain $1+K_1^2w^2$, means for multiplying the latter quantity by $\sin wT_p$ to obtain $(1+K_1^2w^2) \sin wT_p$, means for multiplying the latter quantity by $P_1$ to obtain $(1+K_1^2w^2)P_1 \sin wT_p$, means for adding the latter quantity ot the quantity $$(K_1w \cos wT_p + \sin wT_p)P$$

to obtain the sum of the latter two quantities, means for multiplying $K_1w$ by $P_p$ to obtain $K_1wP_p$, means for comparing the latter quantity with $$(K_1w \cos wT_p + \sin wT_p)P + (1+K_1^2w^2)P_1 \sin wT_p$$

to obtain $$K_1wP_p-(K_1w \cos wT_p + \sin wT_p)P + (1+K_1^2w^2)P_1 \sin wT_p$$

equal theoretically to zero and deviating therefrom by an error quantity, and a servo mechanism having as an input the latter error quantity to effect a null seeking operation and to obtain thereby $P_p$, the latter quantity being employed as a factor for $K_1w$ to obtain $K_1wP_p$.

2. A device for predicting continuously the value $P_p$ of a sinusoidal system at a future time $T_p$ having available a continuing signal corresponding in magnitude to the present values P of the system and for obtaining said value $P_p$ as a physical quantity in the form of a signal, comprising means responsive to a continuous signal corresponding in magnitude to the continuing values P for mechanizing and solving continuously the equations.

$$K_1K_2(K_1P_1-K_2P_2)w^2=K_2(P-P_1)-K_1(P-P_2)$$

and $$K_1wP_p-(K_1w \cos wT_p + \sin wT_p)P + (1+K_1^2w^2)P_1 \sin wT_p=0$$

for the predicted value $P_p$ and for obtaining a continuing signal corresponding in magnitude to the solved $P_p$, and including two integrator follow-up devices, each including an integrator for integrating in relation to time, a differential having a P input, a feed-back input from the output of said integrator and an output for setting the quantity to be integrated into said integrator, one of said integrator follow-up devices computing the value $K_1K_2^2P_2$ and the other follow-up device computing the value $K_1^2K_2P_1$ and a differential for comparing the outputs of said integrator follow-up devices to obtain the value $K_1K_2(K_1P_1-K_2P_2)$, in said equations, $K_1$ and $K_2$ representing the time constants of said integrators respectively, $P_1$ and $P_2$ the outputs of said integrators respectively, and $w$ the angular velocity of the simple harmonic motion of which said system is assumed to be composed, and means for continuing the operation of said mechanizing and solving means until the future time $T_p$ has been reached, whereby a continuous signal is obtained approaching in magnitude the true value of $P_p$ as the future time $T_p$ is approached.

3. A device as described in claim 2 for predicting the pitch angle of a floating deck at a future time $T_p$ knowing the present pitch angle of the deck, wherein P represents the present pitch angle of the deck and $P_p$ the predicted pitch angle of the deck at the future time $T_p$.

4. A device as described in claim 2 for predicting the height of a floating deck at the future time $T_p$, knowing the present height of the deck, wherein P represents the present height of the deck and $P_p$ the predicted height of the deck at the future time $T_p$.

5. A device for predicting the value of a fluctuating system as described in claim 2, wherein said device comprises means responsive to input P and including said integrator follow-up devices, for obtaining the quantities $$K_1K_2(K_1P_1-K_2P_2)w^2 \text{ and } K_2(P-P_1)-K_1(P-P_2)$$

means for comparing the last two mentioned quantities for obtaining a quantity which is theoretically zero but which deviates therefrom by an error amount, means having as input said error quantity for solving the equation.

$$K_1K_2(K_1P_1-K_2P_2)w^2=K_2(P-P_1)-K_1(P-P_2) \text{ for } w,$$

means responsive to the inputs P, $T_p$ and $w$ for obtaining the quantities $$K_1wP_p,$$
$$-(K_1 w \cos wT_p + \sin wT_p) P, \text{ and}$$
$$(1+K_1^2w^2) P_1 \sin wT_p,$$

means for adding algebraically the last three quantities to obtain a quantity which is theoretically zero but which deviates therefrom by an error amount, and means having as an input the last-mentioned error quantity for solving the equation $$K_1wP_p-(K_1w \cos wT_p + \sin wT_p)P + (1+K_1^2w^2)P_1 \sin wT_p=0$$

for the quantity $P_p$.

References Cited in the file of this patent

UNITED STATES PATENTS

| | | |
|---|---|---|
| 2,404,011 | White | July 16, 1946 |
| 2,407,665 | Holschuh et al. | Sept. 17, 1946 |
| 2,442,792 | White et al. | June 8, 1948 |

OTHER REFERENCES

Electronic Instruments (Greenwood), pages 131 to 135, 1948.

Product Engineering (Reid et al.), August 1949, pages 131–135, September 1949, pages 119–123, October, 1949, pages 126–130; November, 1949, pages 121–124.

Electron-tube Circuits (Seely), pages 164 to 165, 1950.